June 2, 1931.　　J. E. FERGUSON ET AL　　1,808,301
AUTOMATIC RADIOTRON TUBE TESTING MACHINE
Filed Oct. 18, 1928　　5 Sheets-Sheet 1

INVENTORS
J.E. FERGUSON
C.A. NICOLAI
BY
ATTORNEY

June 2, 1931.  J. E. FERGUSON ET AL  1,808,301
AUTOMATIC RADIOTRON TUBE TESTING MACHINE
Filed Oct. 18, 1928  5 Sheets-Sheet 2
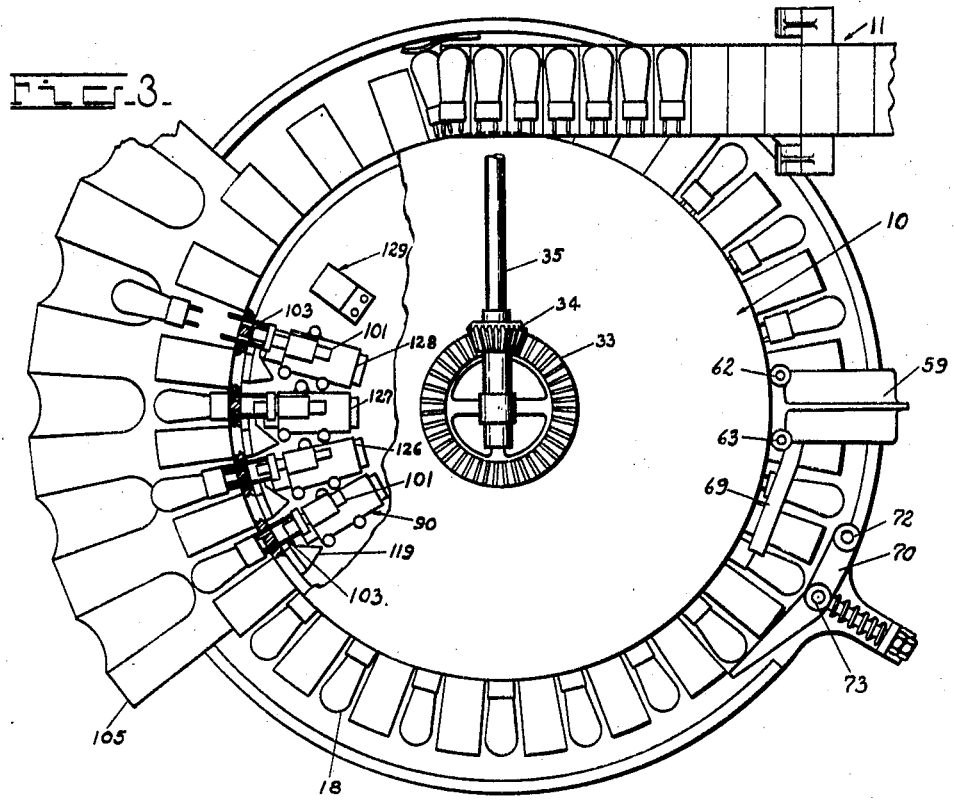
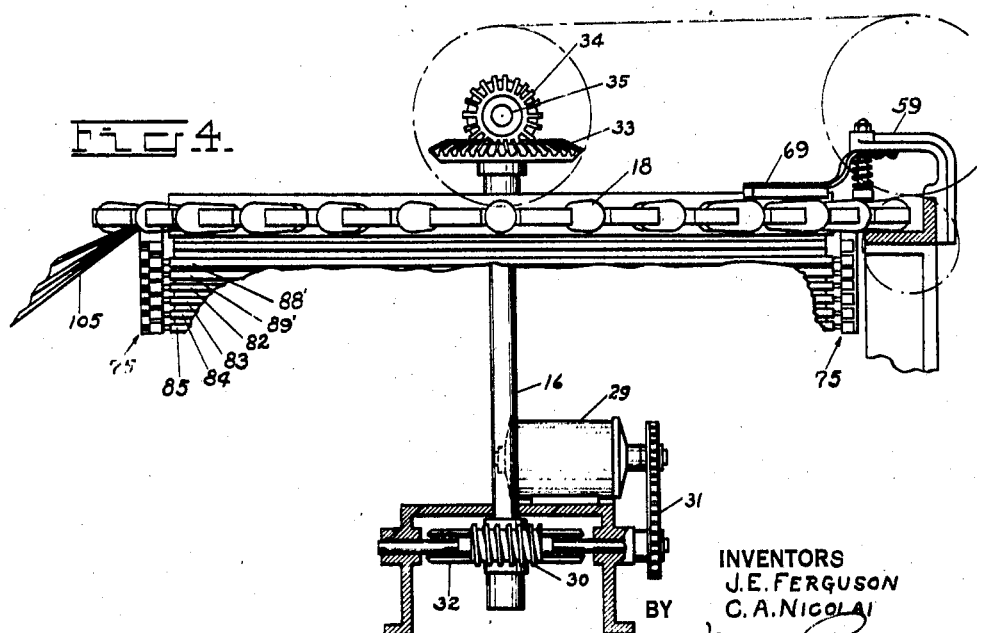
INVENTORS
J. E. FERGUSON
C. A. NICOLAI
BY
ATTORNEY

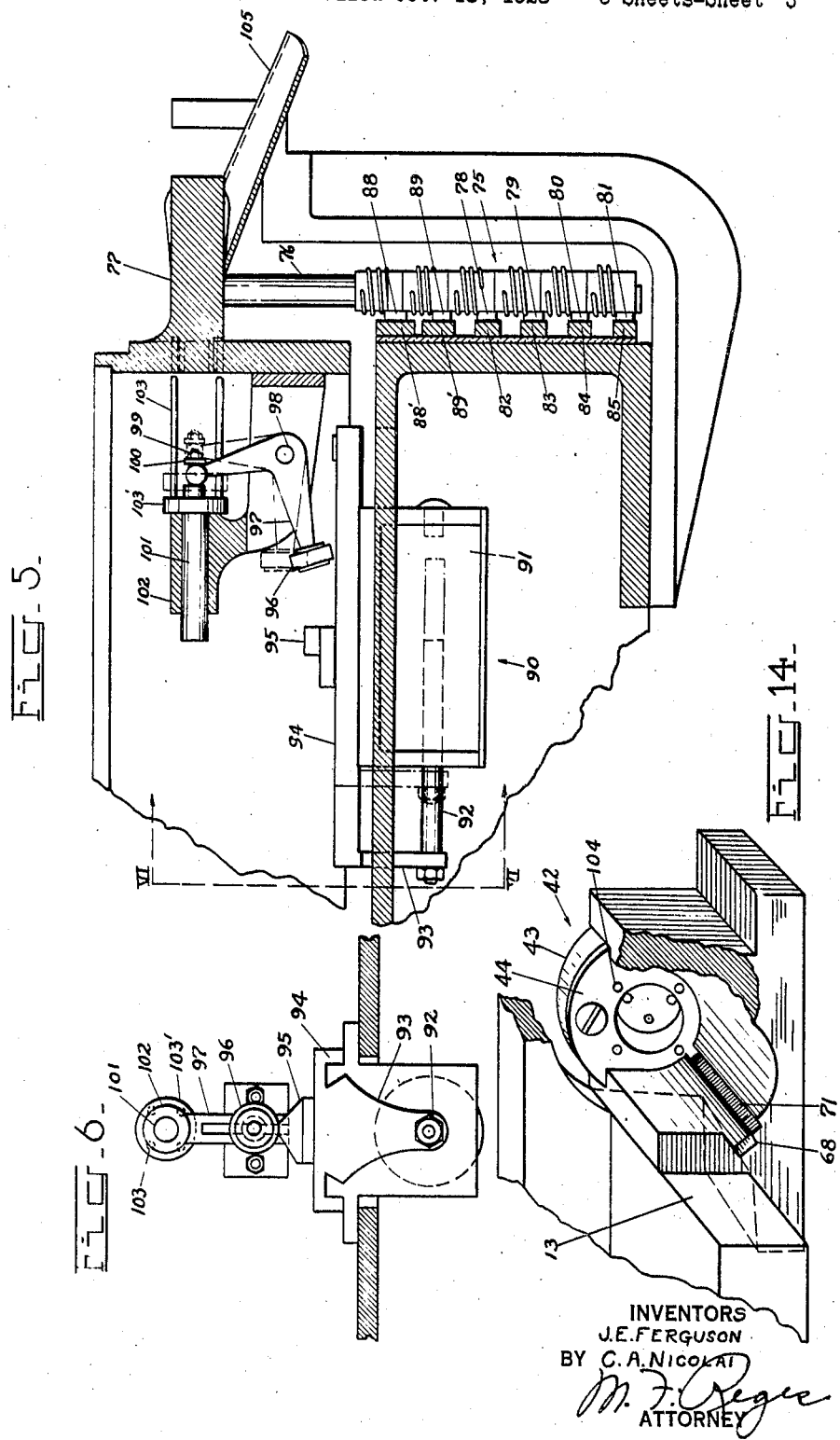

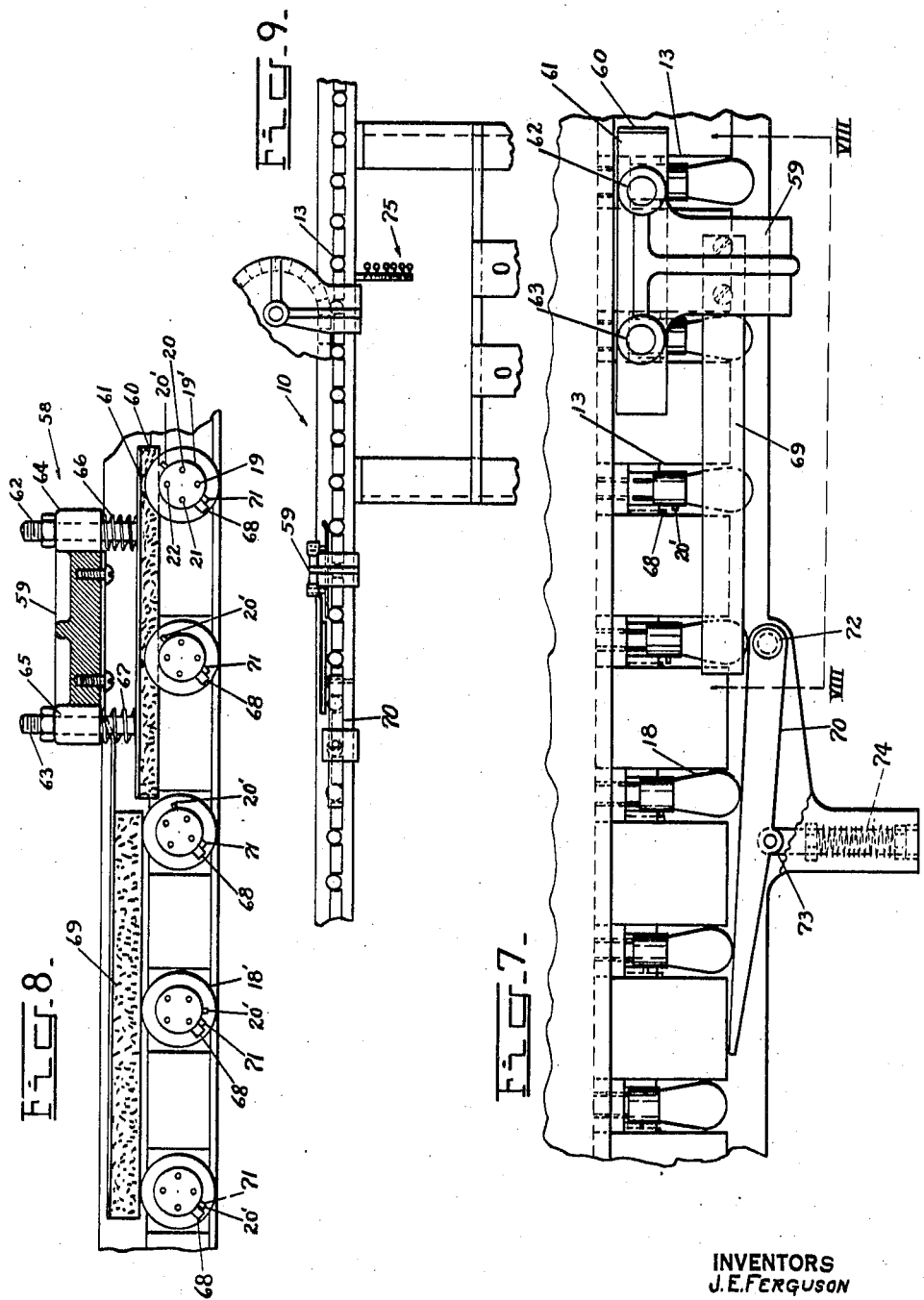

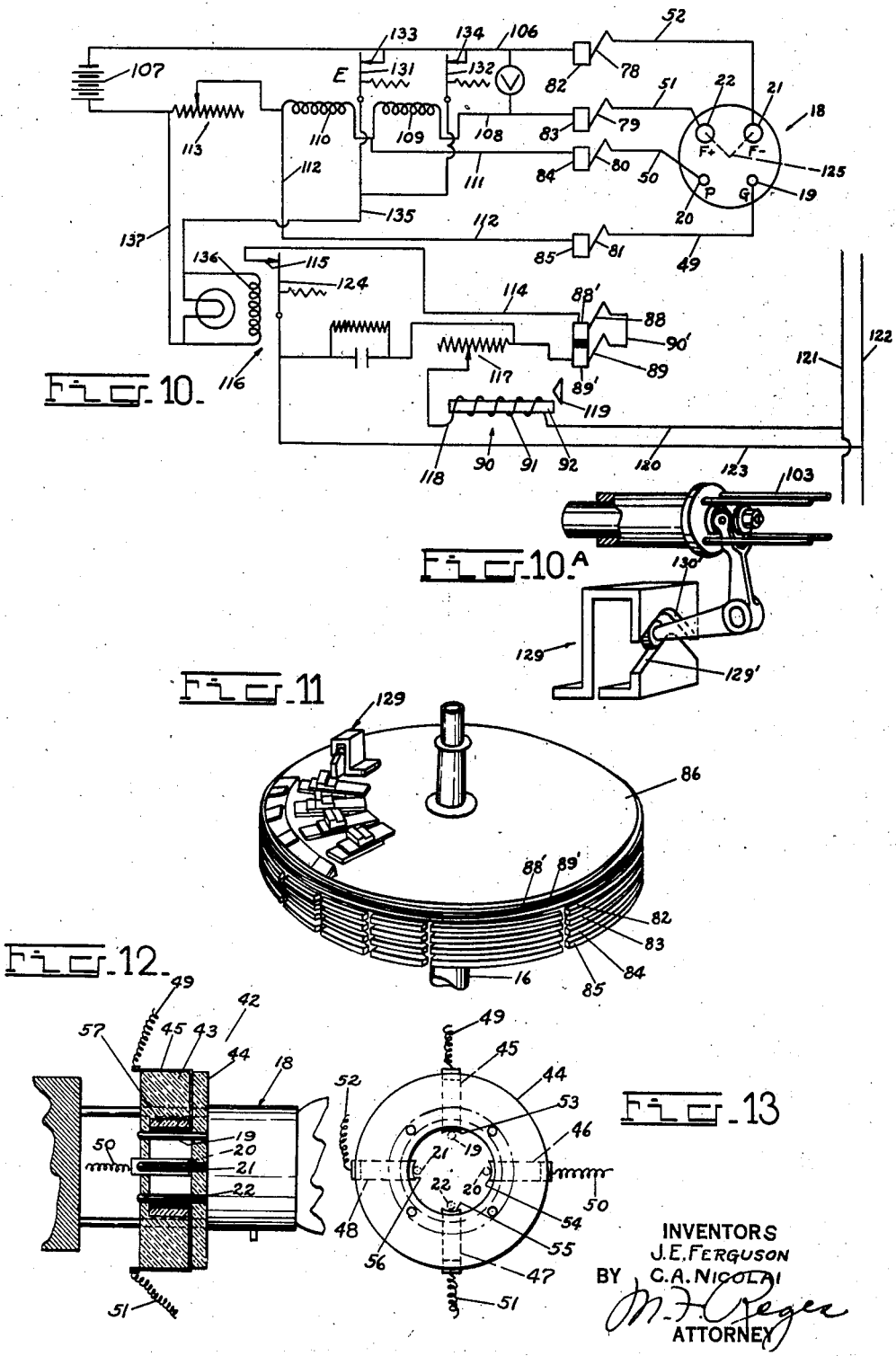

Patented June 2, 1931

1,808,301

UNITED STATES PATENT OFFICE

JOHN E. FERGUSON AND CHARLES A. NICOLAI, OF BLOOMFIELD, NEW JERSEY, ASSIGNORS TO WESTINGHOUSE LAMP COMPANY, A CORPORATION OF PENNSYLVANIA

AUTOMATIC RADIOTRON TUBE TESTING MACHINE

Application filed October 18, 1928. Serial No. 313,221.

This invention relates to an apparatus for the inspection and testing of electrical devices such as radio tubes or the like and relates more particularly to improvements in apparatus of the above character as shown and described in copending application Serial No. 168,541, filed February 16, 1927, apparatus and method for testing electrical devices and assigned to the same assignee as is the present invention.

In certain types of electrical devices, such as radio tubes or similar articles employing electrodes enclosed in an evacuated container, it is necessary to produce such devices with given predetermined characteristics. For the purpose of insuring a given standard and maintaining quality, it is essential that the finished product come within the limits specified according to data governing the production of such devices. Radio tubes, as extensively used in radio receiving circuits, must be tested before leaving the factory and any that do not answer the specified requirements are rejected and either rejuvenated or destroyed as the case may be. Certain physical defects which occur in the manufacture of radio tubes are of a mechanical nature and therefore are readily detected by inspection. There are other possible defects, however, relating to the electrical characteristics of the tube which cannot be detected except by the employment of certain electrical instrumentalities operable to produce visible indications of such defects. Defects of this nature are due to manufacturing irregularities and must be discovered and defective devices must be rejected if all the tubes sold as marketable products are to have uniform characteristics.

It is well known that a given type of radio tube, for example, must operate within certain limits of plate current when a specified filament, grid and plate voltage are applied so as to give satisfactory results in operation. Such tubes must also be capable of producing a given electron emission and must be substantially free from gas. All of the above conditions are carefully considered and the electrical characteristics are measured and if during the inspection of a tube it is found that the plate current varies outside of the given range or the emission is below a given range or if the tube is gassy and ionization occurs, such tube is rejected. Certain of the tubes may, however, be recovered by subjecting them to what is termed a reseasoning operation. Others may be reconditioned by readjusting the electrodes, etc. Other defects, however, may occur, such as a short circuit by means of a break in the filament or other more serious defects in which case it is usually more profitable to discard the tube entirely.

It will therefore be appreciated that it is important to carefully separate tubes which are defective from tubes which are operative. Furthermore, it is desirable to assort the tubes which are defective so as to collect all tubes having common defects into common groups.

In the above mentioned copending application a method is described setting forth the entire operations of testing and assorting electric devices for given electrical characteristics and a semi-automatic machine for performing the mechanical operation to effect this assortment is also clearly set forth.

It is an object of the present invention, therefore, to provide an improved machine for testing electrical articles which will automatically receive, test and reject the articles.

Another object of the invention is to provide a machine of the more durable and simple construction wherein radio tubes or the like may be received and tested by a high rate of speed.

Other objects and advantages of the invention will be appreciated from the following description together with the accompanying drawings in which, Fig. 1 is a perspective view of a machine embodying the present invention;

Fig. 3 is a plan view of the machine shown in Fig. 1 partly broken away to show certain of the internal mechanism;

Fig. 4 is a side elevational view of the machine shown in Fig. 3, certain portions being in cross section to show internal operating parts;

Fig. 5 is an enlarged detail view partly in cross section showing the commutator and a set of brushes as well as mechanism for ejecting articles when tested;

Fig. 6 is a view taken substantially on line VI—VI in Fig. 5; but showing the lever in contact with an actuating cam.

Fig. 7 is a developed plan view of a portion of the machine shown in Fig. 3 illustrating mechanism for adjusting radio tubes to insert the contacts thereof into apertures in a conveyor.

Fig. 8 is a side elevational view taken substantially on line VIII—VIII in Fig. 7;

Fig. 9 is a side elevational view on a reduced scale of a portion of the machine showing a portion of a conveyor for delivering tubes to a carrier as well as the mechanism for adjusting the tubes in the carrier.

In Figs. 7, 8 and 9 the conveyor is shown as being straight instead of circular in order to simplify the drawings and more clearly show the operative parts.

Fig. 10 is an electrical wiring diagram giving an example of a testing circuit which may be employed in connection with the present apparatus;

Fig. 10a, is a perspective fragmentary view showing mechanism for reciprocating a stripper member.

Fig. 11 is a perspective view of a stationary commutator showing the relative positions of two projecting elements.

Fig. 12 is a detail view, partly in section, of one of the sockets for receiving a radio tube;

Fig. 13 is an end view of the socket shown in Fig. 12 and showing the bulb in dotted line; and Fig. 14 is a fragmentary perspective view of a socket portion of a conveyor showing a socket.

Figure 1:
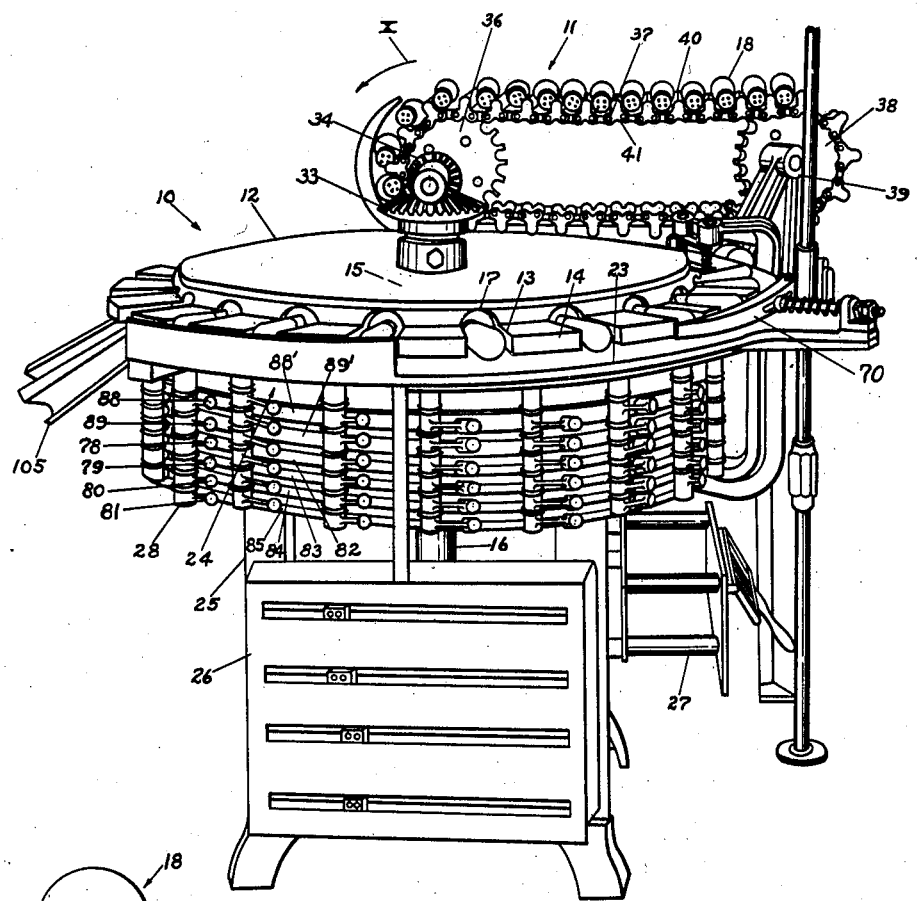
Figure 2:
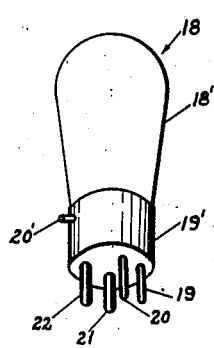
Fig. 2 is a perspective view of a radio tube as an example of a device of the type capable of being tested by the present apparatus.

A practical embodiment of the present invention as illustrated in Fig. 1 may comprise a radio tube testing machine, indicated as a whole by the numeral 10, positioned to receive radio tubes or the like from a conveyor 11. The testing machine may comprise a rotatable carrier 12 having a plurality of guide or tube receiving slots 13 disposed in spaced relation along an edge of a flange 14 integral with a spider 15, the said spider being secured to a vertical and centrally disposed shaft 16.

Adjacent to each of the said slots is a notch 17 for receiving an electrical device such as a radio tube 18 comprising bulb portion 18' and a base 19', the said base being provided with the usual laterally projecting side pin 20'. Each of the notches is provided with a socket (to be later described) having a plurality of contacts to engage with contact elements or pins 19, 20, 21 and 22 projecting from the base 19' of the tube.

Beneath the flange 14 is positioned a stationary annulus or ledge 23 which serves as a horizontal support for the tubes 18. Beneath the ledge 23 is positioned a stationary commutator 24 supported upon a framework 25, which latter also carries other elements as, for example, a resistance unit 26 and a switch 27. Brushes 28 are provided for connecting each radio tube with the commutator, the said brushes being supported upon and depending from the spider 15.

The above brief description gives a general idea of the primary elements of the apparatus and illustrates the means for carrying the radio tubes through a path for a testing operation.

The operation of the carrier is continuous and a rotation thereof is effected by means of a motor 29 connected with a worm 30 through a chain drive 31. The worm 30 is in mesh with a worm wheel 32 at the lower end of the shaft 16. The upper end of the shaft 16 is provided with a beveled gear 33 in mesh with a beveled gear 34 which is secured to one end of a horizontal shaft 35. The opposite end of the shaft 35 is provided with a sprocket wheel 36 (see Fig. 1) over which an endless chain conveyor 37 is led. The said chain passes over an idler sprocket wheel 38 supported in bearings 39 carried by the framework of the machine. The chain conveyor 37 is provided with spacer members 40 so arranged as to provide pockets 41 to receive radio tubes 18, which may be fed to the conveyor 11 by any suitable means or the conveyor chain may be filled with tubes by an operator.

Heretofore it was necessary for the operator to insert the contact elements of the radio tubes into the conveyor as it moved, in the present machine however, mechanism is provided whereby a multiplicity of easily accessible pockets are provided so that they may be filled with great rapidity and the machine automatically performs the delicate operation of applying the contact elements of the tubes to testing apparatus to be later described.

As the conveyor 11 moves in the direction of the arrow X a tube is dropped into a guide slot 13 (see Figs. 7 to 9) and is carried along by the conveyor. It will be appreciated that inasmuch as a radio tube is provided with the four contact elements 19, 20, 21 and 22 which connect with different electrodes within the bulb, it is necessary to engage each of the said contact elements with a particular contact on the conveyor. The arrangement of the contacts is shown more clearly in Figs. 12 and 13 in which tube receiving devices which may be termed sockets 42 are shown, one socket being seated in each of the notches 13. Each socket (as shown in Figs. 12 and 13) may comprise a base plate 43 and a cover plate 44 of any suitable electrical non-conductive material having conductors 45, 46, 47 and 48. The conductors consist of U-shaped members connected at one end to conductors 49, 50, 51 and 52, respectively, and are formed with contact portions 53, 54, 55 and 56 to engage with the sides of the contact elements of a tube 18, between the portions 53, 54, 55 and 56. In an inner wall of the base plate 43 is disposed a layer of rubber or other elastic insulating material in the form of a ring 57 so that the contact portions of the contact members are held in close relation to the pins of a tube. The above described socket is of considerable advantage in providing a firm and intimate contact and the said socket is more clearly shown and described in copending application Serial No. 249,805, filed Jan. 27, 1928, and assigned to the same assignee as is the present invention.

As above mentioned, when a radio tube is initially disposed in one of the notches 13 it must be adjusted so that its pins or contact elements be engaged with the proper contacts of the socket and obviously each tube applied to a socket must be applied in the same relative position.

To accomplish an adjustment of the tubes, means are provided in the form of a friction member 58 carried on a bracket 59. The friction member may include a resilient strip 60 supported on a carrier 61 having guide pins 62 and 63 disposed in bearings 64 and 65 of the bracket 59. The pins are held against downward movement by suitable nuts and springs 66 and 67 disposed between the bearings 64 and 65 respectively, hold the strip 60 under tension. The said resilient strip 60 is so disposed as to engage the base portion 19' of a tube as it is moved with the conveyor. The frictional engagement between the base and the resilient member 60 causes the tube to be rotated in a clockwise direction.

This rotary movement continues until the pin 20' of the tube engages a stop 68 (see Fig. 14). The tube is then carried along with the conveyor and a friction pad 69 engages the glass or bulb portion 18' of the tube, maintaining the tube in position with the pin engaged with the stop. When held in this position means in the form of a presser bar 70 engages with the end of the bulb, pressing the same inwardly, and a slot 71 is provided to permit the passage of the pin and guide the tube so that as it is pressed in by the presser bar 70, the contact elements 19, 20, 21 and 22 of the tube will engage with the proper contacts 53, 54, 55 and 56 of the socket. The presser bar 70 may be in the form of a lever pivoted at 72 and having a guide rod 73 pivoted intermediate its ends. The guide rod may be provided with a spring 74 so as to cushion the action of the bar during its function of pressing the radio tubes into electrical engagement with the contacts in the sockets.

For the purpose of electrically connecting the sockets, and consequently the tube therein, with an electrical circuit through the stationary commutator 24, a movable contact member 75 is provided for each socket and consists of a downwardly projecting rod 76 supported on a flange 77 integral with the spider 15. The said rod is provided with a plurality of contact members or brushes 78, 79, 80 and 81. These brushes engage stationary contacts, as, for example, contacts 82, 83, 84 and 85, respectively, of the commutator, which is in the form of a cylinder or drum 86 secured to the framework of the machine. The contacts 78, 79, 80 and 81 may be electrically connected with the conductors 49, 50, 51 and 52 leading to the socket 42 so that when a tube is positioned in a socket, electrical energy applied to the commutator may pass through the brushes and thence to the tube. The commutator is provided with additional contacts 88 and 88' and the contact member 50 is provided with additional brushes 88 and 89 for the purpose of passing a current through a solenoid 90. The brushes 88 and 89 are connected together for purposes to be presently described.

The solenoid 90 consists of a coil 91 and an armature 92. The armature is provided with an extension 93 connected to a reciprocal slide plate 94 upon which is disposed a cam member 95. When a radio tube is disposed in a socket and current passes through the various electrodes therein by reason of the brushes and commutator contacts, electrical current flows through a circuit (to be later described) and if the said tube is defective means are provided for closing the circuit through the coil of the solenoid, current passing through the brushes 88 and 89 and the commutator contacts 88 and 88', thus moving the cam member 95 to position for engagement with a roller 96 on a bell crank member 97 (see Fig. 5).

When the cam 95 is advanced toward the bell crank member a movement of the conveyor causes the roller 96 on one arm of the bell-crank 97 to engage with the cam 95. The bell-crank 97 is pivoted at 98 and its opposite arm is provided with a bifurcated end 99. The said end engages in a slot 100 attached to a plunger 101 disposed in a guide bearing 102. The said plunger is provided with a disc 103' and with stripper pins 103 which pass through apertures 104 (see Fig. 14) in the socket 42 and thus eject a tube from a socket, causing the tube to travel down a chute 105 and thence to a suitable receptacle.

The present apparatus may obviously be constructed to test electrical devices such, for example, as radio tubes, for various characteristics and a plurality of electrical circuits may be provided for passing current through different sets of electrodes within the tube by connecting said circuits with a plurality of sets of stationary contacts constituting the stationary commutator. For example, in the testing of radio tubes it is desirable to provide one circuit for testing the tubes for open filament, filament to plate short circuit, grid to plate short circuits. Another testing circuit is provided to test for gassy tubes, minus filament to plate leakage, plus filament to plate leakage, grid to plate leakage, low emission tubes, the said last mentioned circuit also operating to test tubes for the same defects as enumerated for the first mentioned circuit.

Another circuit may be provided for testing tubes for low plate current, high plate current, open filaments, minus filament to plate short circuits, plus filament to short plate circuits. Furthermore, a preheating or seasoning period may be provided by providing a contact member on the drum so arranged that current will flow through the filament of a tube for a given time period and at a given voltage prior to the operation of testing.

The circuit illustrated in Fig. 10, which is an example of one testing circuit, operates to test the devices for open filaments, filament to plate short circuit and grid to plate short circuit. This circuit is generally the same as the first testing circuit of the apparatus shown and described in the above first mentioned copending application and will serve as an example to illustrate the operativeness of the present device, although it is to be understood that the present apparatus may operate to test for any other characteristics and also to preheat or season the filament as described in copending application Serial No. 273,233, filed April 27, 1928 which is assigned to the assignee of the present application.

Referring more specifically to Fig. 10, it will be noted that the stationary contacts 82, 83, 84 and 85 are shown diagrammatically and that brushes 78, 79, 80 and 81 are shown engaged with the last mentioned stationary contacts. Contacts 88' and 89' are also shown as well as brushes 88 and 89 for the solenoid circuit, which solenoid is indicated at 90.

When a radio tube 18 is disposed in a socket the contact elements 19, 20, 21 and 22 are connected to the conductors 49, 50, 51 and 52 which lead from the sockets 42, the said conductors connecting with the particular set of brushes provided, as, for example, brushes 78, 79, 80 and 81, which engage contacts 82, 83, 84 and 85 respectively. The contact 82 is connected by a lead 106 to a source of electrical energy 107. The contact 83 is connected by a conductor 108 to one side of a pair of master relays E. The opposite ends of coils 109 and 110 of the master relays may be connected by a conductor 111 to contact 84 which engages with the brush 80 which connects with the contact element 20 of the tube and constitutes a plate circuit.

The grid contact 19 of the tube is connected by the conductor 49 to the brush 81 engageable with the stationary contact 85, which latter contact is connected by a conductor 112 to coil 110 of the master relays E, the conductor 112 being connected to a source of energy 107 through a variable resistance 113. The stationary contact 87 is constructed in two sections 88' and 89' which are insulated from each other and the brushes 88 and 89 are connected together at 90' so that when the brushes pass over the contacts 88' and 89' the said sections thereof are short circuited. Section 88' of the said solenoid contact is connected by a conductor 114 to a contact 115 of a relay 116. The contact 89' is connected through a variable resistance 117 to an end 118 of a coil 91 of the solenoid 90. The said solenoid, as above set forth, is provided with an armature 92 which is normally moved to a retracted position by a cam member 119 (see Fig. 3) secured to the ledge 23 so that when the solenoid moves with the conveyor past the cam member it will be automatically retracted or set, at which time no electrical energy is passing through the solenoid.

The opposite end of the coil 91 is connected by conductor 120 with any suitable source of electrical current supply, indicated at 121 and 122. The return flow of current through the coil 91 may pass through conductor 123 which is connected to a movable arm 124 of the relay 116. If a tube is applied to a socket, electrical energy will flow from the source of energy 107 through lead 106, contact 82, brush 78, conductor 52, filament contact 21, through filament 125 (indicated in dotted lines), conductor 51, brush 79, contact 83, conductor 108, through coils 109 and 110 of the relays E, resistance 113 and thence to the source of energy 107. The passage of current through the partial circuit just described effects the relay 116 to actuate the solenoid circuit, as will presently be set forth.

The solenoid which is diagrammatically shown in Fig. 10 is more clearly shown in Figs. 3 and 5 and as above described the conveyor having sockets 42 disposed in spaced relation is adapted to move radio tubes when disposed in the sockets into operative relation to the circuit shown in Fig. 10 and to connect the radio tube with the circuit by reason of the traveling brushes.

It will be obvious that where more than one circuit is employed the solenoid 90 may be repeated as by additional solenoids 126, 127 and 128 so that when a tube is subjected to one electrical testing circuit and the tube is operated in so far as the particular characteristics for which that circuit test is concerned, the solenoid 90, for example, will not operate.

As the tube is moved into operative relation to the next circuit, a defect therein will effect the next solenoid as, for example, solenoid 126, etc., the number of solenoids depending upon the number of circuits employed for testing different groups of electrical characteristics.

If a tube is entirely operative and no defects occur, it will pass all the circuits and be automatically mechanically ejected by a stationary box-cam. The said box-cam is so disposed as to engage with the roller 96 of the bell-crank 97. The cam 129 is stationary being secured to the drum 86 and as the conveyor moves the roller 96 will first engage surface 129' of the cam (see Fig. 10A) causing the stripper pins 103 to eject a tube and a continued movement of the conveyor causes the roller 96 to engage surface 130' of the cam and retract stripper pins to their initial position ready to be again actuated.

From an inspection of the circuit above described it will be evident that when the filament 125 is intact and permits a flow of electrical energy through the relays E movable arms 131 and 132 will be positioned away from contacts 133 and 134, these contacts being connected to the source of energy 107. The arms 131 and 132 are connected by conductor 135 to one side of a coil 136 of the relay 116 which may be termed the power control relay. The opposite side of the coil 136 is connected by a conductor 137 to the source of energy 107. Thus upon a contact of either of the arms 131 and 132 against their respective contacts, a flow of energy will occur in the coil 136 of the relay 116. The arms 131 and 132 may be provided with the usual spring or tension members operating to bring the arms into engagement with the contacts when released from the influence of energy flowing through the coils 109 and 110. Thus a flow of current through the relays as when the filament is unbroken, will break the circuit comprising leads 106 and 137.

From the foregoing it will be seen that when the current flows through the relays E the solenoid 90 is not actuated since the arms 131 and 132 are then moved from the contacts 133 and 134. If, however, the filament 125 is broken and no current passes through the relays the contact arms thereof will be actuated by their respective springs to close the circuit and cause a flow of electrical energy through the relay 116, thus effecting a movement of arm 124 thereof into engagement with a contact 115, the arm 124 being connected to one of the power lines 122.

Since the section 88' of the solenoid contact, as above set forth, is connected by conductor 114 to the contact 115 of the control relay, an engagement between the arm 124 and the contact 115 will cause current to flow through conductor 123, 120, coil 91, resistance 117, section 89' of the solenoid contact and thence through the brushes 88 and 89 which are connected at 90'.

A flow of current therefore will cause an actuation of the solenoid to eject a tube having a broken filament after which a movement of the conveyor will cause the cam 129 to reset the solenoid and since the brushes 88 and 89 pass from contact with the solenoid contacts 88' and 89', the solenoid will be reset ready for another operation when in position to subject another tube for a testing operation.

The various electrical connections may be insulated from each other throughout and in the mechanical showing of the drawing the wiring is merely indicated since it is thought that the same will be readily understood to those versed in the art.

By reason of the present invention, radio tubes or other articles to be tested for electrical characteristics may be fed at a rapid rate to the testing machine and subjected to the testing operation whereupon they are automatically separated into groups tubes having like defects being collected together.

In the manufacture of radio tubes, for example, it is important to be able to perform a testing operation on a radio tube with accuracy and at a high rate of speed. This is possible by reason of the present invention where, as above mentioned, an operator may feed the tubes to the conveyor without the exercise of skill or dexterity as was required when it was necessary to insert each tube into a socket in a predetermined manner. Moreover, the present invention may be used in connection with other machines on which previous manufacturing operations are performed, as for example, the tubes may be automatically supplied to the present machine from a machine which performs the last manufacturing operation, such as a seasoning machine.

Although a preferred embodiment of the present invention is shown and described herein it is to be understood that modifications may be made therein without departing from the spirit and scope of the invention as set forth in the appended claims.

What is claimed is:

1. A machine for testing radio tubes comprising a testing circuit, a plurality of contacts electrically connected with said circuit, a carrier, a plurality of contact members on said carrier, tube receiving means adjacent to said contact members, means for positioning a radio tube in said tube receiving means and means for adjusting said tube to engage predetermined contact elements thereof with predetermined contact members on said carrier.

2. A machine for testing radio tubes comprising a testing circuit, a plurality of contacts electrically connected with said circuit, a carrier, a plurality of contact members on said carrier, tube receiving means adjacent to said contact members, means for positioning a radio tube in said tube receiving means, means for adjusting said tube to engage predetermined contact elements thereof with predetermined contact members on said carrier and means for moving said conveyor to engage the stationary contacts with the movable contact members for the passage of electrical energy through said positioned tube.

3. A machine for testing radio tubes comprising a testing circuit, a plurality of contacts electrically connected with said circuit, a carrier, a plurality of contact members on said carrier, tube receiving means adjacent to said contact members, means for positioning a tube in said receiving means, means for adjusting said tube to engage predetermined contact elements thereof with predetermined contact members on said carrier, means for moving said conveyor to engage said stationary contacts with said movable contact members for the passage of electrical energy through a positioned tube, electrically controlled tube discharging means and means for actuating said discharging means when a defective radio tube is applied to said circuit.

4. A machine for testing radio tubes comprising a testing circuit, a plurality of contacts electrically connected with said circuit, a carrier, a plurality of contact members on said carrier, tube receiving means adjacent to said contact members, means for positioning a radio tube in said receiving means, means for adjusting said tube to engage predetermined contact elements thereof with predetermined contact members on said carrier, means for moving said conveyor to engage the stationary contacts with the movable contact members for the passage of electrical energy through a positioned tube, electrically controlled tube discharging means, means for actuating said discharging means when a defective tube is applied to said circuit and means for automatically discharging tubes not discharged by said electrically controlled discharge means.

5. In a machine for testing radio tubes having contact members, the combination of a carrier, supporting means on said carrier for receiving said tubes, contact elements adjacent to said supporting means, means for disposing said tubes in said supporting means and means for adjusting said tubes to engage the contact members thereof with said contact elements.

6. A machine for testing electrical devices having contact members comprising a carrier, holding means on said carrier for said devices, contact elements adjacent to said holding means and means for adjusting said devices during movement with said carrier to engage the contact members thereof with said contact elements.

7. A machine for testing radio tubes or the like comprising a movable carrier having a plurality of sockets to receive base portions of tubes, said sockets having apertures to receive contact elements extending from said tubes, means for passing electrical energy through said tubes and means movable through said apertures for engaging said contact elements to eject tubes.

8. A machine for testing radio tubes or the like comprising a movable carrier, a plurality of sockets on said carrier, contact members in said sockets, means for positioning tubes with their contact elements adjacent to said contact members, means for adjusting the positioned tubes to engage the contact elements with the contact members, tube ejector means movable through said sockets and means for actuating said ejector means to discharge tubes from said sockets upon a predetermined movement of the carrier.

9. A machine for testing radio tubes or the like comprising a carrier, a plurality of sockets on said carrier, said sockets having apertures to receive the contact elements of radio tubes and means operable in said apertures for ejecting said tubes.

10. A machine for testing radio tubes or the like comprising a carrier, a plurality of sockets on said carrier, means for supporting tubes adjacent to said sockets and operating in conjunction with the moving carrier for inserting the base portions of positioned tubes into said sockets.

In testimony whereof, we have hereunto subscribed our names this 17th day of October, 1928.

JOHN E. FERGUSON.
CHARLES A. NICOLAI.